(12) United States Patent
Kim (10) Patent No.: US 11,761,931 B2
(45) Date of Patent: Sep. 19, 2023

(54) APPARATUS AND METHOD FOR ANALYZING DYNAMIC MODE CHANGE OF ANISOTROPIC MATERIALS

(71) Applicant: PUKYONG NATIONAL UNIVERSITY INDUSTRY-UNIVERSITY COOPERATION FOUNDATION, Busan (KR)

(72) Inventor: Chan Jung Kim, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 134 days.

(21) Appl. No.: 17/410,173

(22) Filed: Aug. 24, 2021

(65) Prior Publication Data

US 2022/0397558 A1 Dec. 15, 2022

(30) Foreign Application Priority Data

Jun. 11, 2021 (KR) .......................... 10-2021-0075856

(51) Int. Cl.
*G01N 29/44* (2006.01)
*G01N 29/12* (2006.01)

(52) U.S. Cl.
CPC .......... *G01N 29/449* (2013.01); *G01N 29/12* (2013.01); *G01N 2291/014* (2013.01)

(58) Field of Classification Search
CPC ................. G01N 29/449; G01N 29/12; G01N 2291/014; G01N 2291/0231; G01N 29/46;

(Continued)

(56) References Cited

U.S. PATENT DOCUMENTS 5,195,046 A * 3/1993 Gerardi ................. B64D 15/20
73/659
2007/0140310 A1* 6/2007 Rolton ................... G01N 25/72
374/44

FOREIGN PATENT DOCUMENTS

JP 2015-032295 2/2015

OTHER PUBLICATIONS

Kang, Kim, and Lee, "Modal Damping Coefficient Estimation of Carbon-Fiber-Reinforced Plastic Material Considering Temperature Condition", Materials, MDPI, Jun. 26, 2020 (Year: 2020).*

* cited by examiner

*Primary Examiner* — Natalie Huls
*Assistant Examiner* — Cynthia L Davis
(74) *Attorney, Agent, or Firm* — NORTON ROSE FULBRIGHT US LLP (57) ABSTRACT

A method for analyzing dynamic mode change of an anisotropic material includes performing modal analysis of a first physical force applied to an isotropic material specimen and a first vibration signal collected from the isotropic material specimen, acquiring a first modal parameter of the isotropic material specimen, based on the modal analysis result, performing modal analysis of a second physical force applied to the anisotropic material specimen and a second vibration signal collected from the anisotropic material specimen, acquiring a second modal parameter of the anisotropic material specimen, based on the modal analysis result, acquiring a modal assurance criterion (MAC) for each mode of the anisotropic material specimen, based on the first and second modal parameters, and acquiring each similar mode of the anisotropic material specimen to each mode of the isotropic material specimen.

13 Claims, 8 Drawing Sheets

(58) Field of Classification Search
CPC ........ G01N 29/045; G01N 3/405; G01N 3/30; G01N 3/34; G01N 2203/0039; G01N 2203/0096
See application file for complete search history.

Mode 1

FIG. 4A

Mode 2

FIG. 4B

Mode 3

FIG. 4C

Mode 4

FIG. 4D

Mode 5

FIG. 4E

Mode 1

FIG. 5A

Mode 2

FIG. 5B

Mode 3

FIG. 5C

Mode 4

FIG. 5D

Mode 5

APPARATUS AND METHOD FOR ANALYZING DYNAMIC MODE CHANGE OF ANISOTROPIC MATERIALS

CROSS-REFERENCE TO RELATED APPLICATION

This application claims a benefit under 35 U.S.C. § 119(a) of Korean Patent Application No. 10-2021-0075856 filed on Jun. 11, 2021, with the Korean Intellectual Property Office, the entirety of disclosure of which is incorporated herein by reference for all purposes.

BACKGROUND

Field

The present disclosure relates to a method and a system for analyzing dynamic mode change of an anisotropic material. More specifically, the present disclosure relates to a method and a system for analyzing dynamic mode change of an anisotropic material in which the dynamic mode change occurs in the anisotropic material.

Description of Related Art

Isotropy refers to a case in which intrinsic material properties, such as Young's modulus, Poisson's Ratio, and thermal conductivity, etc., are uniform in all directions in the material, while anisotropy refers to a case in which the intrinsic material properties change depending on a direction varying based on a certain point.

In fact, strictly isotropic materials do not exist on Earth. In general, an isotropic material means an ideal case in which the change in property coefficients depending on the varying direction is insignificant in a macroscopic dimension and thus the material is assumed to be isotropic. The property coefficients of a material are greatly affected by a size, a shape, an arrangement direction, and a distribution form of microparticles constituting the material.

Magnification of the material under an electron microscope reveals that these characteristics of the particles are not uniform but are very irregular.

In other words, from a microscopic point of view, almost all materials are anisotropic. A term often used in conjunction with the isotropy to define the material is homogeneity. A material is homogeneous when property coefficients thereof are constant across points in the material. A material is inhomogeneous when property coefficients thereof are not constant across points in the material. A metal composed of single type particles may be a representative homogeneous isotropic material, while a composite material composed of two or more different types of particles is a representative inhomogeneous anisotropic material.

For a material having the isotropy, only a peak is selected using only a large number of measured frequency response components. Thus, each mode of the material may be easily selected. However, for a carbon composite material (carbon fiber reinforced material) as a material having the anisotropy, dynamic characteristics thereof may vary depending on a carbon fiber. Thus, change in a resonance frequency and a mode shape as modal test results occurs.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a method and a system for analyzing dynamic mode change of an anisotropic material in which the dynamic mode change of the anisotropic material may be analyzed in response to a phenomenon in which a sequence of dynamic modes occurring in the anisotropic material changes, unlike an isotropic material.

Another purpose of the present disclosure is to provide a method and a system for analyzing dynamic mode change of an anisotropic material in which the dynamic mode change of the anisotropic material may be analyzed using not only a modal assurance criterion (MAC) but also a resonance frequency, and a modal damping coefficient, thereby increasing analysis accuracy.

Still another purpose of the present disclosure is to provide a method and a system for analyzing dynamic mode change of an anisotropic material in which physical properties of the anisotropic material may be derived via the analysis of the dynamic mode change of the anisotropic material.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

One aspect of the present disclosure provides a method for analyzing dynamic mode change of an anisotropic material, the method comprising: applying a first physical force having a preset first pattern to one face of an isotropic material specimen; collecting a first vibration signal generated due to the first physical force at a preset position of the isotropic material specimen; performing modal analysis of the first physical force applied to the isotropic material specimen and the first vibration signal collected from the isotropic material specimen, and acquiring a first modal parameter of the isotropic material specimen, based on the modal analysis result, wherein the first modal parameter includes M modes, a first resonance frequency based on each of the M modes, and a first damping coefficient based on each first resonance frequency; applying a second physical force having a preset second pattern to one face of an anisotropic material specimen; collecting a second vibration signal generated due to the second physical force at a preset position of the anisotropic material specimen; performing modal analysis of the second physical force applied to the anisotropic material specimen and the second vibration signal collected from the anisotropic material specimen, and acquiring a second modal parameter of the anisotropic material specimen, based on the modal analysis result, wherein the second modal parameter includes N modes, a second resonance frequency based on each of the N modes, and a second damping coefficient based on each second resonance frequency; acquiring a modal assurance criterion (MAC) for each of the N modes of the anisotropic material specimen, based on the first modal parameter of the isotropic material specimen and the second modal parameter of the anisotropic material specimen; and acquiring each similar mode of the anisotropic material specimen to each mode of the isotropic material specimen, based on the first resonance frequency and the first damping coefficient for each mode of the isotropic material specimen and the second resonance frequency, the second damping coefficient, and the modal assurance criterion (MAC) for each mode of the anisotropic material specimen.

In one implementation of the method, the anisotropic material specimen includes a carbon composite material having carbon fibers oriented to have unidirectionality at a specific angle θ.

In one implementation of the method, the specific angle θ includes one of 0 degree, 30 degrees, 45 degrees, 60 degrees and 90 degrees.

In one implementation of the method, the acquiring of the second modal parameter of the anisotropic material specimen includes acquiring the second modal parameter of each of a plurality of carbon composite materials having different carbon fiber orientations.

In one implementation of the method, the acquiring of the modal assurance criterion for each of the N modes of the anisotropic material specimen includes acquiring the modal assurance criterion for each of a plurality of carbon composite materials having different carbon fiber orientations, wherein the acquiring of each similar mode of the anisotropic material specimen includes acquiring each similar mode of each of a plurality of carbon composite materials having different carbon fiber orientations.

In one implementation of the method, the acquiring of the modal assurance criterion includes performing cross-calculation between each of the M modes of the isotropic material specimen and the N modes of the anisotropic material specimen to calculate the modal assurance criterion.

In one implementation of the method, the acquiring of the modal assurance criterion includes calculating the modal assurance criterion using a following Equation 1:

$$MAC(i, j) = \frac{|(\psi_i)^T(\psi_j)^*|^2}{((\psi_i)^T(\psi_j)^*)((\psi_j)^T(\psi_i)^*)} \quad \text{[Equation 1]}$$

where $(\psi_i)^T$ denotes a transpose matrix of an i-th mode shape $\psi_i$, and $(\psi_i)^*$ denotes a conjugate matrix of the i-th mode shape $\psi_i$. Further, $(\psi_j)^T$ and $(\psi_j)^*$ respectively denote a transpose matrix and a conjugate matrix of a j-th mode shape $\psi_j$.

In one implementation of the method, the acquiring of each similar mode of the anisotropic material specimen includes: acquiring a mode shape of the isotropic material specimen similar to a mode shape of each mode of the anisotropic material specimen, using mode shape information of each mode of the isotropic material specimen as reference data; and determining a mode having a high similarity level, based on the MAC value, the resonance frequency, and the damping coefficient.

One aspect of the present disclosure provides a system for analyzing dynamic mode change of an anisotropic material, the system comprising: a vibration exciter configured to: set a first vibration-excitation pattern under control and apply a first physical force having the first vibration-excitation pattern to one face of an isotropic material specimen; and set a second vibration-excitation pattern under control and apply a second physical force having the second vibration-excitation pattern to one face of an anisotropic material specimen; and a sensor configured to: collect a first vibration signal generated from the isotropic material specimen due to the first physical force at a preset location of the isotropic material; and collect a second vibration signal generated from the anisotropic material specimen due to the second physical force at a preset location of the isotropic material; and a modal analyzer configured to: perform first modal analysis of the first physical force applied to the isotropic material specimen and the first vibration signal collected from the isotropic material specimen; acquire a first modal parameter of the isotropic material specimen, based on the first modal analysis result, wherein the first modal parameter includes M modes, a first resonance frequency based on each of the M modes, and a first damping coefficient based on each first resonance frequency; perform second modal analysis of the second physical force applied to the anisotropic material specimen and the second vibration signal collected from the anisotropic material specimen; and acquire a second modal parameter of the anisotropic material specimen, based on the second modal analysis result, wherein the second modal parameter includes N modes, a second resonance frequency based on each of the N modes, and a second damping coefficient based on each second resonance frequency; and a similar mode analyzer configured to: acquire a modal assurance criterion (MAC) for each of the N modes of the anisotropic material specimen, based on the first modal parameter of the isotropic material specimen and the second modal parameter of the anisotropic material specimen; and acquire each similar mode of the anisotropic material specimen to each mode of the isotropic material specimen, based on the first resonance frequency and the first damping coefficient for each mode of the isotropic material specimen and the second resonance frequency, the second damping coefficient, and the modal assurance criterion (MAC) for each mode of the anisotropic material specimen.

In one implementation of the system, the anisotropic material specimen includes a carbon composite material having carbon fibers oriented to have unidirectionality at a specific angle θ.

In one implementation of the system, the specific angle θ includes one of 0 degree, 30 degrees, 45 degrees, 60 degrees and 90 degrees.

In one implementation of the system, a similar mode analyzer is further configured to perform cross-calculation between each of the M modes of the isotropic material specimen and the N modes of the anisotropic material specimen to calculate the modal assurance criterion.

In one implementation of the system, a similar mode analyzer is further configured to calculate the modal assurance criterion using a following Equation 1:

$$MAC(i, j) = \frac{|(\psi_i)^T(\psi_j)^*|^2}{((\psi_i)^T(\psi_j)^*)((\psi_j)^T(\psi_i)^*)} \quad \text{[Equation 1]}$$

where $(\psi_i)^T$ denotes a transpose matrix of an i-th mode shape $\psi_i$, and $(\psi_i)^*$ denotes a conjugate matrix of the i-th mode shape $\psi_i$. Further, $(\psi_j)^T$ and $(\psi_j)^*$ respectively denote a transpose matrix and a conjugate matrix of a j-th mode shape $\psi_j$.

The present disclosure may realize the method and the system for analyzing dynamic mode change of the anisotropic material in which the dynamic mode change of the anisotropic material may be analyzed in response to a phenomenon in which a sequence of dynamic modes occurring in the anisotropic material changes, unlike an isotropic material.

Further, the present disclosure may realize the method and the system for analyzing dynamic mode change of the anisotropic material in which the dynamic mode change of the anisotropic material may be analyzed using not only the modal assurance criterion (MAC) but also the resonance frequency, and the modal damping coefficient, thereby increasing analysis accuracy.

Furthermore, the present disclosure may realize the method and the system for analyzing dynamic mode change of the anisotropic material in which physical properties of the anisotropic material may be derived via the analysis of the dynamic mode change of the anisotropic material.

Effects of the present disclosure are not limited to the above-mentioned effects, and other effects as not mentioned will be clearly understood by those skilled in the art from following descriptions.

DETAILED DESCRIPTIONS

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for describing an embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various embodiments of the present disclosure may be partially or entirely combined with each other, and may be technically associated with each other or operate with each other. The embodiments may be implemented independently of each other and may be implemented together in an association relationship. Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, when the device in the drawings is turned over, elements described as "below" or "beneath" or "under" other elements or features would then be oriented "above" the other elements or features. Thus, the example terms "below" and "under" may encompass both an orientation of above and below. The device may be otherwise oriented for example, rotated 90 degrees or at other orientations, and the spatially relative descriptors used herein should be interpreted accordingly.

Hereinafter, a method and a system for analyzing dynamic mode change of an anisotropic material according to the present disclosure will be described as follows.

Figure 1:
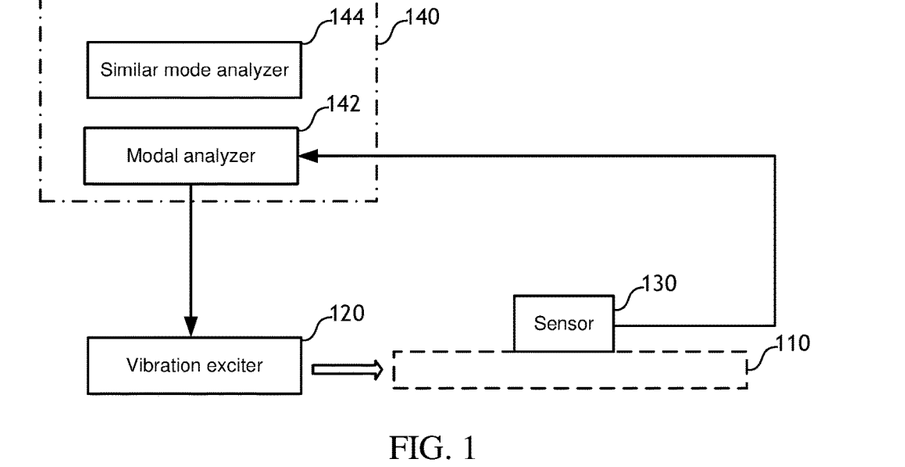
FIG. 1 is a configuration diagram showing a configuration of a system for analyzing dynamic mode change of an anisotropic material according to one embodiment of the present disclosure.

FIG. 1 is a configuration diagram showing a configuration of a system for analyzing dynamic mode change of an anisotropic material according to one embodiment of the present disclosure.

Referring to FIG. 1, a system 100 for analyzing dynamic mode change of an anisotropic material may include a vibration exciter 120, a sensor 130, and a mode change analyzer 140.

The system 100 for analyzing the dynamic mode change of the anisotropic material may analyze the dynamic mode change of the anisotropic material in response to change in a sequence of dynamic modes occurring in the anisotropic material, unlike the isotropic material. For example, the system 100 for analyzing the dynamic mode change may obtain an isotropic material specimen similar to an anisotropic material specimen for each mode, based on a modal assurance criterion (MAC), a resonance frequency, and a modal damping coefficient. That is, the system 100 for analyzing the dynamic mode change of the anisotropic material may use mode shape information about the isotropic material specimen as reference data, and compare the reference data with a mode shape of the anisotropic material specimen, and may determine a mode of the isotropic material specimen having a high similarity level to a mode of the anisotropic material specimen.

The vibration exciter 120 sets a vibration-excitation pattern under control, and applies a physical force corresponding to the set vibration-excitation pattern to one face of a specimen 110. In one embodiment, the vibration exciter 120 may apply a physical force to a preset position of the specimen 110.

The vibration exciter 120 may include a fixed impact device that may automatically apply an impact to the specimen 110. In one embodiment, the vibration exciter 120 may include an impact hammer or an electrodynamic shaker, etc. Hereinafter, for convenience of description, it is assumed that an impact hammer (5800B3/dytran) is used as the vibration exciter. The impact hammer does not cause a physical damage to the specimen 110, does not require pre-machining for testing, and may apply an impact to the specimen 110 over a wide frequency range. The impact hammer may have a tip as an impact portion.

The sensor 130 contacts a preset position of the specimen 110, and collects a signal generated from the specimen 110 due to the physical force applied from the vibration exciter 120. A type of the sensor 130 may vary depending on a type of a physical signal to be collected. For example, when measuring an acceleration vibration, an acceleration sensor may be used. When measuring a surface velocity, a laser sensor may be used. When measuring a displacement, a photogrammetry or string pots may be used. Hereinafter, for convenience of description, it is assumed that an acceleration sensor is used as the sensor 130 to collect vibration signals.

The mode change analyzer 140 includes a modal analyzer 142 and a similar mode analyzer 144. The modal analyzer 142 performs modal analysis of the physical force applied to the specimen 110 and the vibration signal collected by the sensor 130 and obtains modal parameters of the specimen 110 (N modes (mode shapes), mode-based resonance frequencies, and resonance frequency-based damping coefficients). In one embodiment, the modal analyzer 142 performs modal analysis of the physical force applied to the anisotropic material specimen 110 and the vibration signal collected by the sensor 130, and obtains second modal parameters of the anisotropic material specimen 110 (N modes (mode shapes), mode-based second resonance frequencies, and second resonance frequency-based second damping coefficients).

The similar mode analyzer 144 compares pre-stored first modal parameters of the isotropic material specimen (N modes (mode shapes), mode-based first resonance frequencies, and first resonance frequency-based first damping coefficients) with the second modal parameters of the anisotropic material specimen 110 (N modes (mode shapes), mode-based second resonance frequencies, and second resonance frequency-based second damping coefficients), and may determine each mode (hereinafter, similar mode) of the isotropic material specimen having a high similarity level to each mode of the anisotropic material specimen.

Figure 2:
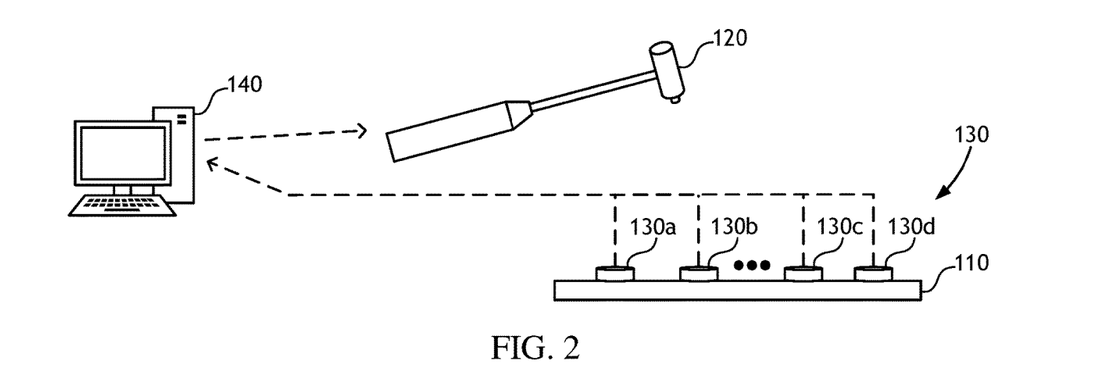
FIG. 2 is a configuration diagram exemplarily showing a configuration of a system for analyzing dynamic mode change of an anisotropic material, wherein the system includes a plurality of sensors.

FIG. 2 is a configuration diagram exemplarily showing a configuration of a system for analyzing dynamic mode change of an anisotropic material, wherein the system includes a plurality of sensors. Hereinafter, for the convenience of description, the description will be focused on differences between FIG. 1 and FIG. 2.

Referring to FIG. 2, a plurality of sensors 130a, 130b, 130c, 130d, . . . may be located on one face of the specimen 110. The configuration of FIG. 2 is the same as that of FIG. 1 except that the plurality of sensors 130a, 130b, 130c, 130d, . . . collects the vibration of the specimen 110. The number and positions of the sensors may vary depending on implementations.

The positions of the plurality of sensors 130a, 130b, 130c, 130d, . . . may be preset or may be set by a user. The plurality of sensors 130a, 130b, 130c, 130d, . . . collect the vibration of the specimen 110 at the positions thereof and transmit the collected vibration to the mode change analyzer 140.

Hereinafter, with reference to FIG. 1 to FIG. 8, a process in which the first modal parameter of the isotropic material specimen and the second modal parameter of the anisotropic material specimen are obtained, and each similar mode of the isotropic material specimen to each mode of the anisotropic material specimen is determined based on a modal assurance criterion (MAC), a resonance frequency, and a modal damping coefficient will be described with reference to a specific example.

The system 100 for analyzing the dynamic mode change applies the physical force to the isotropic material specimen and calculates the first modal parameters of the isotropic material specimen (including M modes, mode-based first resonance frequencies, and first resonance frequency-based first damping coefficients).

The vibration exciter 120 sets the vibration-excitation pattern under control, and applies the physical force corresponding to the set vibration-excitation pattern to one face of the isotropic material specimen 110. In one embodiment, the vibration exciter 120 may apply the physical force to the preset position of the isotropic material specimen 110. The sensor 130 contacts the preset position of the isotropic material specimen 110, and collects the signal generated from the isotropic material specimen 110 due to the physical force applied from the vibration exciter 120.

Figure 3A:
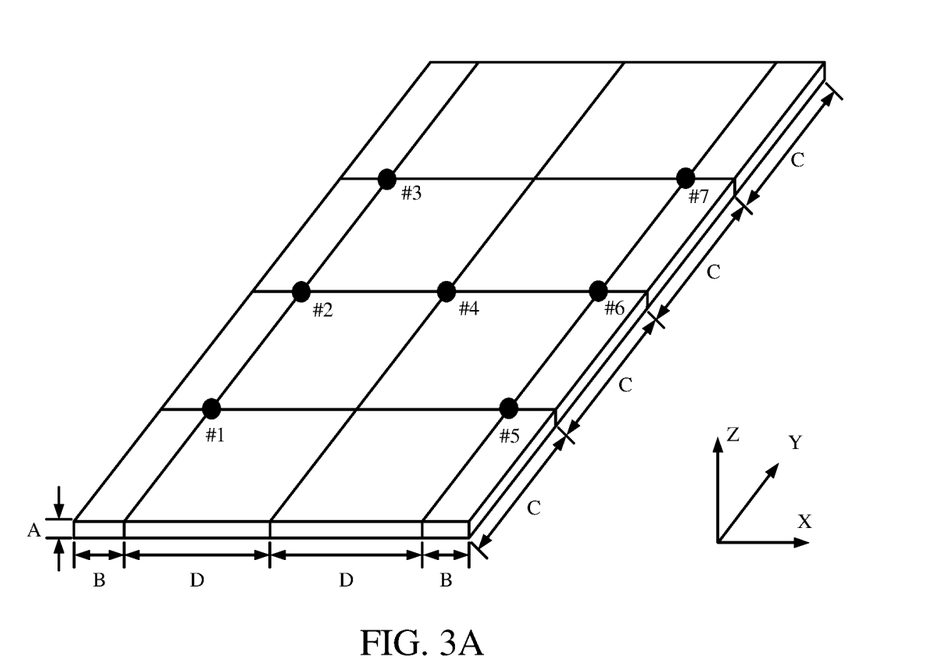
FIG. 3A is a diagram showing one example of an isotropic material specimen and a position thereof to which a sensor is attached.
Figure 3B:
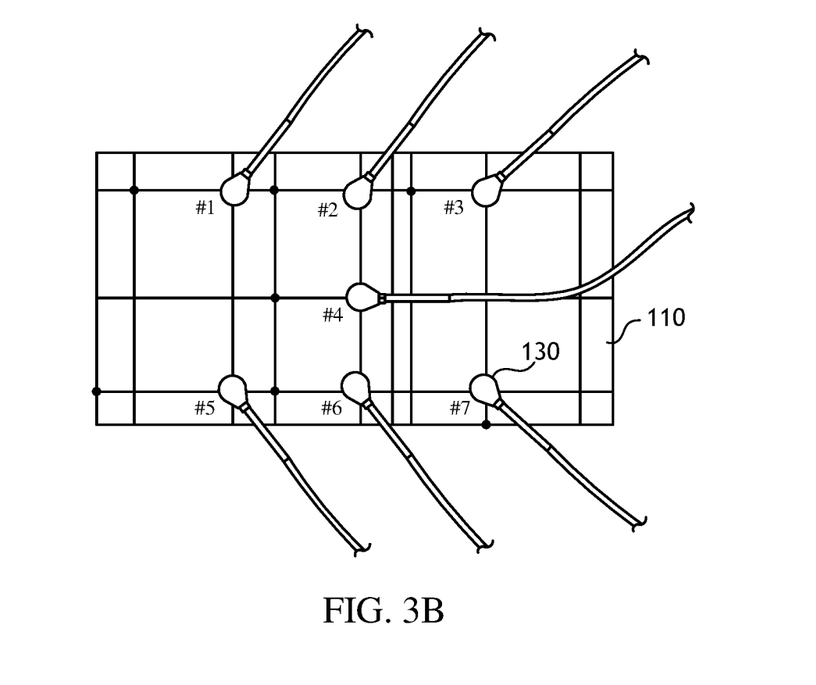
FIG. 3B is a diagram showing one example of an isotropic material specimen to which a plurality of sensors are attached.
Figure 4A:
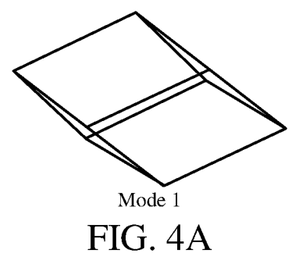
FIG. 4A-4E are diagrams showing a mode shape obtained via experimental modal analysis of an isotropic material specimen.
Figure 4B:
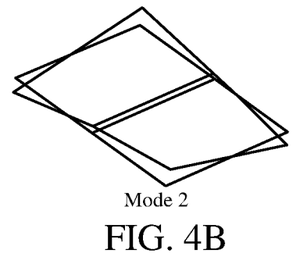
Figure 4C:
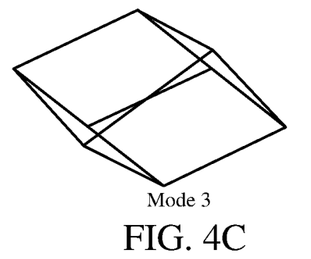
Figure 4D:
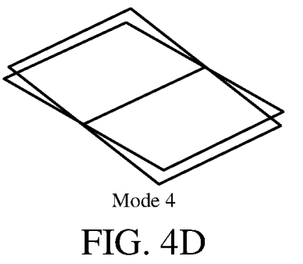
Figure 4E:
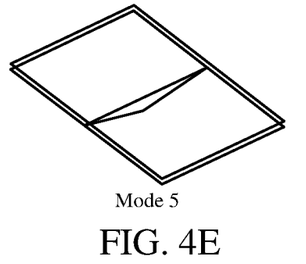
Figure 5A:
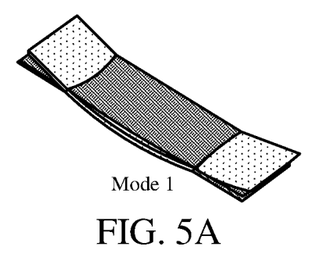
FIG. 5A-5E are diagrams showing a mode shape obtained via theoretical modal analysis of an isotropic material specimen using a finite element model.
Figure 5B:
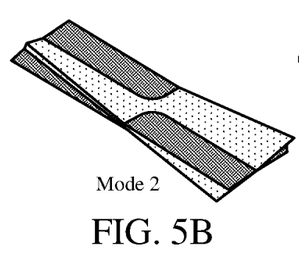
Figure 5C:
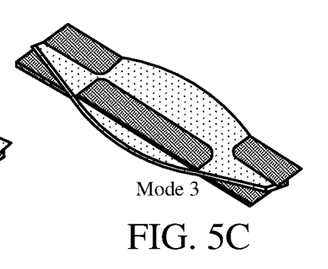
Figure 5D:
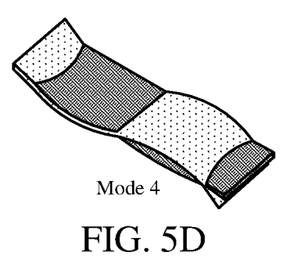
Figure 5E:
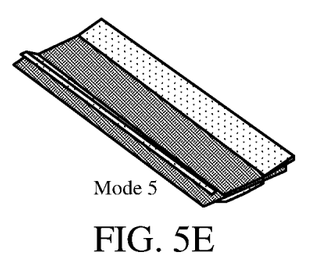

FIG. 3A may be a diagram showing one example of an isotropic material specimen and a sensor attachment position thereof. FIG. 3B is a diagram illustrating one example of an isotropic material specimen to which a plurality of sensors are attached.

Referring to FIG. 3A and FIG. 3B, in an implementation of FIG. 3A and FIG. 3B, each of acceleration sensors 130 was attached to each of seven positions #1, #2, #3, #4, #5, #6, and #7 on one face of the specimen 110 made of an isotropic SS275 material. In the implementation, A was set to 3.0 mm, B was set to 10.0 mm, C was set to 37.5 mm, and D was set to 30.0 mm. In one embodiment, the positions of the sensors and the number of the sensors may vary depending on the implementations. In one embodiment, the sensors may be uniformly spaced from each other and arranged on one face of the isotropic material specimen 110.

The vibration exciter 120 applies a physical force to the position #4 in a −Z-axis direction under control. Then, the sensor 130 at each of the positions #1 to #7 collects a vibration signal and transmits the same to the mode change analyzer 140. The modal analyzer 142 performs modal analysis of the physical force applied to the isotropic material specimen 110 and the vibration signal collected by the sensor 130 to obtain the first modal parameters of the isotropic material specimen 110. The similar mode analyzer 144 may store the first modal parameters of the isotropic material specimen 110.

In the implementation, the modal parameters such as the mode shape, the resonance frequency, and the damping coefficient were calculated via modal analysis using Test Lab analysis software. The modal analysis refers to interpretation of a natural frequency about a vibration related question.

In one embodiment, the isotropic material specimen 110 may be placed in a free-free state. The modal analyzer 142 may perform modal analysis of the isotropic material specimen 110 placed in the free-free state. For example, in an experimental example of FIG. 3B, the modal analysis was performed on the isotropic material specimen 110 while the isotropic material specimen 110 was placed on a rubber band having very low stiffness to obtain the free-free state.

A following Table 1 is an example showing the first modal parameters obtained by performing an experimental modal analysis of the isotropic material specimen in FIG. 3B.

TABLE 1

| Mode | Resonance frequency (Hz) | Modal damping coefficient | Mode shape |
| --- | --- | --- | --- |
| 1 | 698.5 | 0.23 (%) | Bending |
| 2 | 805.0 | 0.28 (%) | Twisting |
| 3 | 1,776.1 | 0.24 (%) | Twisting |
| 4 | 1,914.6 | 0.17 (%) | Bending |
| 5 | 2,474.4 | 0.65 (%) | Bending |

In one embodiment, the modal analyzer 142 performs theoretical model analysis using a finite element model on a shape of the isotropic material specimen 110, and obtains theoretical modal parameters (mode, resonance frequency, and modal damping coefficient of the isotropic material specimen 110. In one embodiment, the finite element model on the shape of the isotropic material specimen 110 may be input by the user.

A following Table 2 shows comparison results between mode-based resonance frequency values (Experiment) obtained by performing an experimental modal analysis of the isotropic material specimen 110 in Table 1, and mode-based resonance frequency values (FE model) obtained by performing theoretical model analysis on the shape of the isotropic material specimen 110.

TABLE 2

| | Resonance frequency (Hz) | | | |
|---|---|---|---|---|
| Mode | Experiment | FE model | Error (%) | MAC |
| 1 | 698.5 | 697.8 | 0.1 | 0.99 |
| 2 | 805.0 | 860.9 | 6.5 | 0.65 |
| 3 | 1,776.1 | 1,807.5 | 1.7 | 0.96 |
| 4 | 1,914.6 | 1,914.4 | 0.0 | 0.99 |
| 5 | 2,474.4 | 2,523.3 | 1.9 | 0.95 |

Referring to Table 2, in order to compare the first modal parameters obtained by performing experimental modal analysis of the isotropic material specimen 110 as shown in FIG. 3B with the first modal parameters obtained by performing theoretical model analysis thereon, an numerical error % and the modal assurance criterion (MAC) were calculated for each mode. In one embodiment, the modal assurance criterion may be calculated using a (MAC) function of a following Equation 1.

$$MAC(i, j) = \frac{|(\psi_i)^T (\psi_j)^*|^2}{((\psi_i)^T (\psi_j)^*)((\psi_j)^T (\psi_i)^*)} \quad [\text{Equation 1}]$$

where $(\psi_i)^T$ denotes a transpose matrix of an i-th mode shape $\psi_i$, and $(\psi_i)^*$ denotes a conjugate matrix of the i-th mode shape $\psi_i$. Further, $(\psi_j)^T$ and $(\psi_j)^*$ respectively denote a transpose matrix and a conjugate matrix of a j-th mode shape $\psi_j$.

Referring to Table 2, it may be identified that although in the first modal parameter obtained by performing the theoretical model analysis, there is a slight error in a second mode, the first modal parameter obtained by performing the experimental modal analysis and the first modal parameter obtained by performing the theoretical model analysis have high reliability for five modes.

FIG. 4 is a diagram showing a mode shape obtained via experimental modal analysis of the isotropic material specimen of FIG. 3B. FIG. 5 is a diagram showing a mode shape obtained via theoretical modal analysis of the isotropic material specimen using the finite element model.

Referring to Table 2 and FIG. 4 and FIG. 5, it may be identified that a mode 1 is a first bending mode, a mode 2 is a first twisting mode, a mode 3 is a second twisting mode, a mode 4 is a second bending mode, and a mode 5 is a third bending mode.

The system 100 for analyzing the dynamic mode change applies the physical force to the anisotropic material specimen again under the same boundary state condition as that of the isotropic material specimen, and thus obtains the second modal parameters of the anisotropic material specimen (N modes, mode-based second resonance frequencies, and second resonance frequency-based second damping coefficients).

The vibration exciter 120 sets the vibration-excitation pattern under control, and applies the physical force corresponding to the set vibration-excitation pattern to one face of the anisotropic material specimen 110. In one embodiment, the vibration exciter 120 may apply the physical force to a preset position of the anisotropic material specimen 110. The sensor 130 contacts the preset position of the anisotropic material specimen 110, and collects a signal generated from the anisotropic material specimen 110 due to the physical force applied from the vibration exciter 120.

Figure 6A:
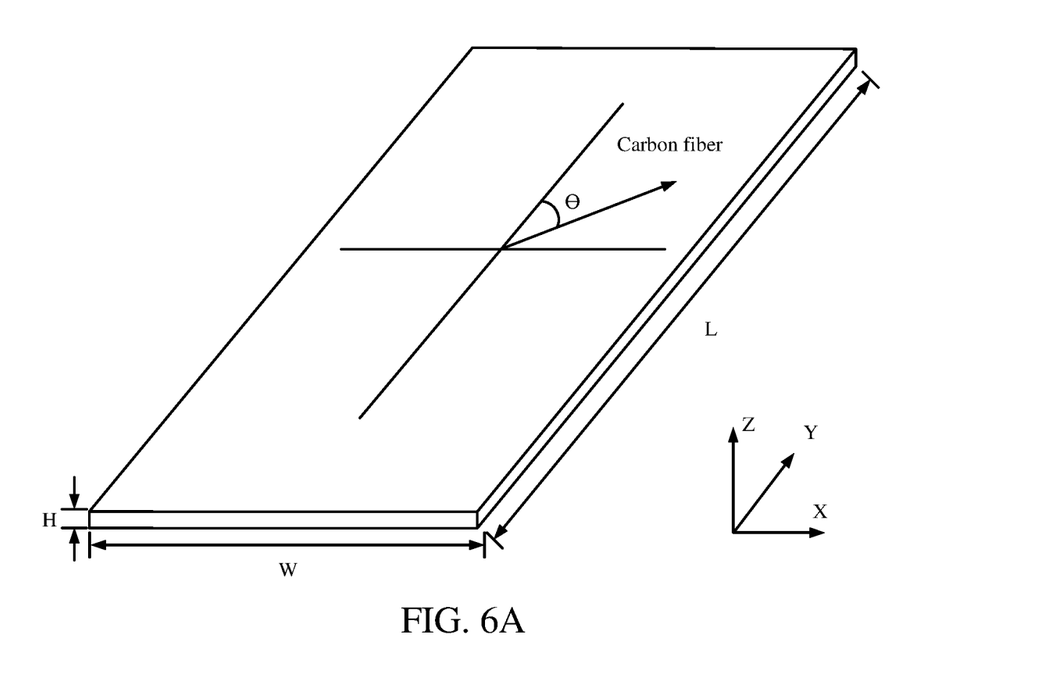
FIG. 6A is a diagram showing one example of an anisotropic material specimen.
Figure 6B:
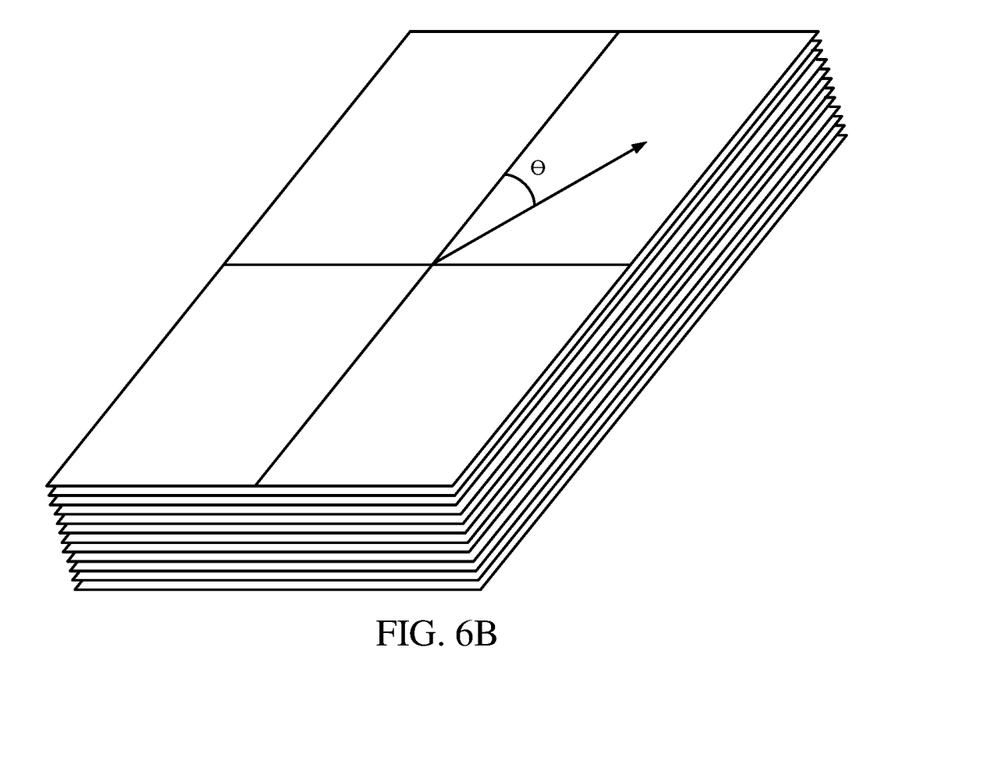
FIG. 6B is a diagram showing one example of a carbon composite material specimen as an anisotropic material.
Figure 6C:
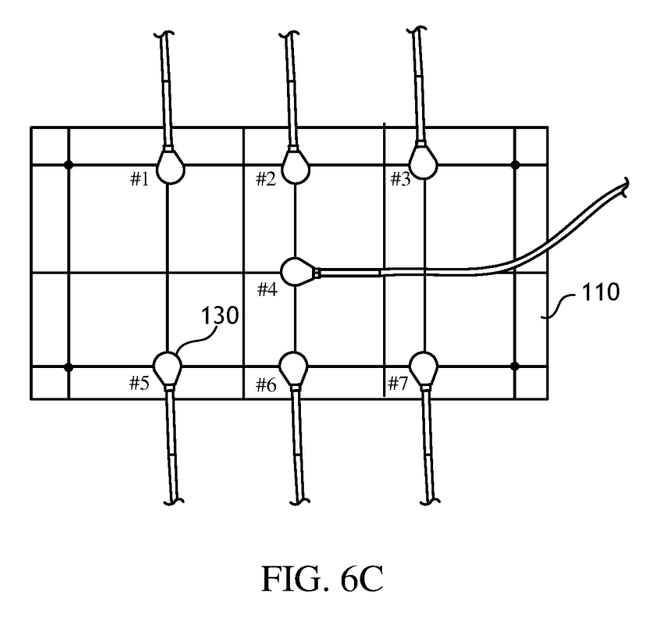
FIG. 6C shows one example of an anisotropic material specimen to which a plurality of sensors are attached.

FIG. 6A is a diagram showing one example of an anisotropic material specimen. FIG. 6B is a diagram showing one example of a carbon composite material (carbon fiber reinforced material) specimen as the anisotropic material. FIG. 6C is a diagram showing one example of an anisotropic material specimen to which a plurality of sensors are attached.

Referring to FIG. 6A, the anisotropic material specimen 110 may be embodied as a carbon composite material (carbon fiber reinforced material) in which carbon fibers are oriented to have one direction at a specific angle θ. For example, the carbon composite material, the carbon fibers may be oriented at a specific angle θ with respect to an y-axis. In one embodiment, the orientation angle θ of the carbon fiber may be one of 0 degree, 30 degrees, 45 degrees, 60 degrees and 90 degrees. In one embodiment, the carbon composite material may include carbon fiber reinforced plastic (CFRP).

In an implementation, modal analysis was performed using each of carbon composite materials respectively having five carbon fiber orientations θ=0°, 30°, 45°, 60°, and 90° as a specimen. In an implementation of FIG. 6B, 12 layers made of prepreg USN 250A (SK Chemicals, carbon fiber: T700, binder: epoxy resin) as a carbon composite material were laminated vertically and were subjected to a hot pressing to form a base material. Then, the base material was cut in 5 different directions (θ=0 degree, 30 degrees, 45 degrees, 60 degrees, and 90 degrees) to produce five carbon composite material specimens. In one embodiment, the carbon composite material specimen may be prepared as a specimen in a form of a rectangle about 3 mm thick in which 12 layers made of the prepreg composite material, each layer having a thickness of about 0.258 mm are laminated in a unidirectional (UD) manner.

Referring to FIG. 6C, each acceleration sensor 130 was attached to seven positions #1, #2, #3, #4, #5, #6, and #7 on one face of each of the five carbon composite materials (0=0 degree, 30 degrees, 45 degrees, 60 degrees and 90 degrees) having different carbon fiber orientations in the same manner as in the isotropic material specimen. In one embodiment, the positions of the sensors and the number of the sensors may be set to be equal to those as in the isotropic material specimen. The system 100 for analyzing the dynamic mode change may obtain the second modal parameter (N modes, mode-based second resonance frequencies, and second resonance frequency-based second damping coefficients) of each of the five carbon composite materials (θ=0 degree, 30 degrees, 45 degrees, 60 degrees and 90 degrees) having different carbon fiber orientations.

The vibration exciter 120 applies a physical force to a position #4 in a −Z-axis direction under control, and the sensor 130 at each of the positions #1 to #7 collects a vibration signal and transmits the same to the mode change analyzer 140. The modal analyzer 142 performs modal analysis of the physical force applied to the carbon composite material 110 as the anisotropic material specimen and the vibration signal collected by the sensor 130, and acquires the second modal parameters of the anisotropic material specimen 110. In the experimental example, the modal parameters such as the mode shape, the resonance frequency, and the damping coefficient were calculated via modal analysis using Test Lab analysis software.

In one embodiment, the anisotropic material specimen 110 may be placed in a free-free state. The modal analyzer 142 may perform modal analysis of the anisotropic material specimen 110 placed in the free-free state.

A following Table 3 is an example showing the resonance frequency and the damping coefficient among the second modal parameters obtained by performing experimental modal analysis on each of the five carbon composite materials having different carbon fiber orientations.

TABLE 3

| Specimen | Resonance frequency (Hz) | Modal damping coefficient (%) |
|---|---|---|
| Specimen 1 ($\theta = 0°$) | 951.0 | 5.3 |
| | 1,149.1 | 0.4 |
| | 1,276.0 | 2.6 |
| | 1,368.5 | 1.3 |
| | 2,162.3 | 2.0 |
| | 2,990.9 | 1.3 |
| | 3,282.0 | 1.2 |
| Specimen 2 ($\theta = 30°$) | 360.7 | 1.8 |
| | 754.5 | 1.5 |
| | 941.1 | 1.2 |
| | 1,450.4 | 1.5 |
| | 1,657.5 | 1.5 |
| | 2,427.8 | 1.8 |
| | 2,502.0 | 4.1 |
| Specimen 3 ($\theta = 45°$) | 330.4 | 1.3 |
| | 595.6 | 1.4 |
| | 878.0 | 1.0 |
| | 1,568.8 | 1.2 |
| | 1,749.3 | 1.5 |
| | 2,267.3 | 2.1 |
| | 2,419.6 | 3.8 |
| Specimen 4 ($\theta = 60°$) | 310.6 | 1.1 |
| | 458.0 | 1.5 |
| | 835.0 | 9.9 |
| | 979.0 | 1.3 |
| | 1,522.9 | 1.0 |
| | 1,589.2 | 2.0 |
| | 2,176.5 | 1.6 |
| | 2,690.4 | 3.9 |
| Specimen 5 ($\theta = 90°$) | 305.2 | 9.9 |
| | 389.9 | 1.7 |
| | 824.1 | 9.9 |
| | 1,388.5 | 1.5 |
| | 1,594.0 | 1.3 |
| | 1,938.5 | 3.7 |
| | 2,625.6 | 2.1 |
| | 3,305.1 | 5.3 |

The similar mode analyzer 144 acquires the modal assurance criterion (MAC) for each of N modes of the anisotropic material specimen using the pre-stored first modal parameter of the isotropic material specimen and the second modal parameter of the anisotropic material specimen. The similar mode analyzer 144 may perform cross-calculation between each of M modes of the isotropic material specimen and the N modes of the anisotropic material specimen to calculate the modal assurance criterion.

In one embodiment, in order to match the first modal parameter in an i-th ($1 \leq i \leq M$) mode shape among M mode shapes of the isotropic material specimen with the second modal parameter in a j-th ($1 \leq j \leq N$) mode shape among N mode shapes of the carbon composite material specimen, the similar mode analyzer 144 calculates the modal assurance criterion (MAC) using orthogonality of mode shape vector information corresponding to modal parameters thereof. In one embodiment, the similar mode analyzer 144 may calculate MAC (i,j) for each of the N modes of the carbon composite material specimen using the above Equation 1. In one embodiment, the similar mode analyzer 144 may calculate MAC (i,j) for each of the N modes of each of 5 carbon composite material specimens having different carbon fiber orientations.

The similar mode analyzer 144 obtains each similar mode of the anisotropic material specimen to each mode of the isotropic material specimen, based on a first resonance frequency and a first damping coefficient of the isotropic material specimen for each mode, and a second resonance frequency, a second damping coefficient, and a modal assurance criterion (MAC) for each mode of the anisotropic material specimen. In one embodiment, the similar mode analyzer 144 may acquire the similar mode of the anisotropic material specimen to each mode of the isotropic material specimen, based on each mode-based similar mode classification criterion preset relative to the resonance frequency, the damping coefficient, and the modal assurance criterion (MAC).

For example, it was identified that in the experimental example, in the three bending modes, a MAC value of the similar mode of each of the specimens having carbon fiber orientations of 0, 60, and 90 degrees was high. Therefore, in each of the carbon composite materials having carbon fiber orientations θ of 0 degrees, 60 degrees and 90 degrees, a similar mode of each bending mode may be obtained using the MAC value. However, it was identified that in the three bending modes, in each of the carbon composite materials having carbon fiber orientations θ of 30 degrees and 45 degrees, the MAC value of the similar modes was low such that it was difficult to obtain a similar mode of each bending mode only using the MAC value.

It was identified that in the two twisting modes, in each of the carbon composite materials having carbon fiber orientations θ of 30 degrees and 45 degrees, the MAC value of the similar mode was relatively high, but it was difficult for the MAC value to act as a clear classification criterion for obtaining the similar mode.

On the contrary, it may be identified that regarding change in the resonance frequency, the resonance frequency tends to decrease as the carbon fiber orientation or angle increases in the first twisting mode except for the second twisting mode. Therefore, when classifying a similar mode of the twisting mode of the carbon composite material, it is more efficient to use the change trend of the resonance frequency rather than to use the MAC value.

However, it was identified that in the second twisting mode, the specimen with the carbon fiber angle or orientation of 30 degrees had the lowest resonance frequency; and when the carbon fiber angle or orientation increased or decreased, the resonance frequency tended to increase.

Change in the damping coefficient (modal damping coefficient) may be effectively used to obtain similar modes of the two twisting modes of the carbon composite material. For example, it was identified that in the two twisting modes, the specimen having the carbon fiber angle of 45 degrees had the lowest damping coefficient value; and the modal damping coefficient value tended to increase when the carbon fiber angle increased or decreased.

It may be identified based on the experimental results that when only one of the MAC value, resonance frequency change, and damping coefficient change is used, it may not be difficult to obtain the similar mode to each mode (for example, each of the three bending modes and the two twisting modes) of the anisotropic material specimen; and when the three indicators, that is, the MAC value, the resonance frequency change, and the damping coefficient change are comprehensively considered, a similar mode having high reliability may be obtained.

A following Table 4 shows the results of classifying the mode (similar mode) of the carbon composite material specimen similar to each of the five modes of the isotropic material specimen. Table 4 classifies the modes of each of the five carbon composite material specimens having different carbon fiber orientations respectively similar to the five modes of the isotropic material specimen.

TABLE 4

SS 275

| Freq. | | Specimen 1 | | | Specimen 2 | | | Specimen 3 | | | Specimen 4 | | | Specimen 5 | | |
|---|---|---|---|---|---|---|---|---|---|---|---|---|---|---|---|---|
| (Hz) | Shape | Freq. | Damp. | MAC | Freq. | Damp. | MAC | Freq. | Damp. | MAC | Freq. | Damp. | MAC | Freq. | Damp. | MAC |
| 698.6 | Bending | 1,149.1 | 0.4 | 0.85 | 360.6 | 1.8 | 0.39 | 330.4 | 1.3 | 0.62 | 310.6 | 1.1 | 0.91 | 305.1 | 0.9 | 0.98 |
| 805.0 | Twisting | 1,276.1 | 2.5 | 0.02 | 754.5 | 1.5 | 0.21 | 595.6 | 1.4 | 0.40 | 458.5 | 1.5 | 0.50 | 380.0 | 1.7 | 0.25 |
| 1,776.1 | Twisting | 1,368.7 | 1.3 | 0.4 | 941.1 | 1.2 | 0.82 | 878.0 | 1.0 | 0.53 | 979.0 | 1.3 | 0.75 | 1,938.5 | 3.7 | 0.06 |
| 1,914.6 | Bending | 2,990.9 | 1.3 | 0.99 | 1,657.6 | 1.5 | 0.01 | 1,568.9 | 1.2 | 1.21 | 835.0 | 0.9 | 0.83 | 824.1 | 0.9 | 0.98 |
| 2,474.4 | Bending | 951.0 | 5.3 | 0.86 | 1,450.4 | 1.5 | 0.55 | 1,749.2 | 1.5 | 1.47 | 2,690.4 | 3.9 | 0.59 | 3,305.1 | 5.3 | 0.67 |

Referring to the Table 4, it may be identified that similar modes to the five modes of the isotropic material specimen (SS275) do not necessarily have similar modal assurance criterion (MAC). Further, it may be seen that the third bending mode (2,474 Hz) of the isotropic material specimen (SS275) is similar to the first mode having the lowest resonance frequency (951.0 Hz) of a first carbon composite material specimen (Specimen 1, θ=0°. That is, the fifth mode (the third bending mode (2,474 Hz)) of the isotropic material specimen may rapidly change to the first mode of the anisotropic carbon composite material specimen. Referring to the mode shape in FIG. 5, it may be identified that this is because when the orientation value θ of the carbon fiber is small, the carbon fiber has very weak stiffness in the Y-axis direction.

In order to more accurately analyze the dynamic mode change of the anisotropic material, it is necessary to simultaneously consider the resonance frequency and the modal damping coefficient in addition to the modal assurance criterion (MAC) as the mode shape information, and further, it is desirable to observe a large number of modes.

Figure 7A:
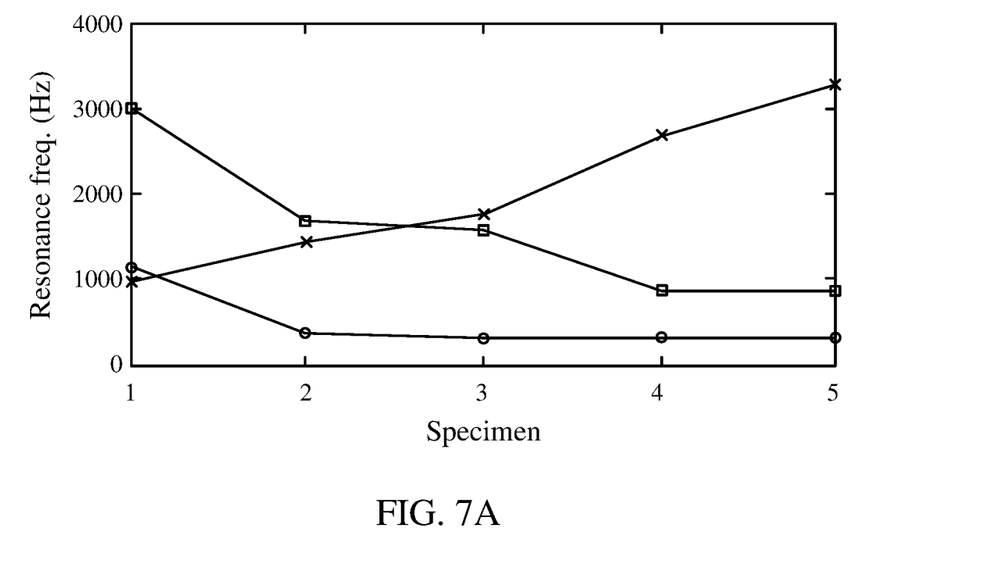
FIG. 7A-7B are diagrams showing change of a resonance frequency based on a mode (bending mode and twisting mode) as an orientation of a carbon fiber increases.
Figure 7B:
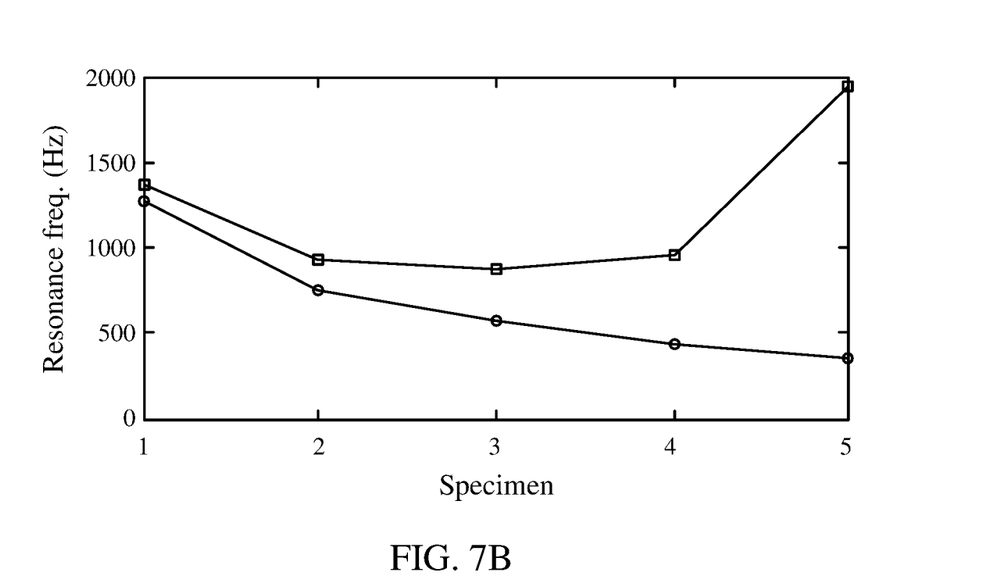
Figure 8A:
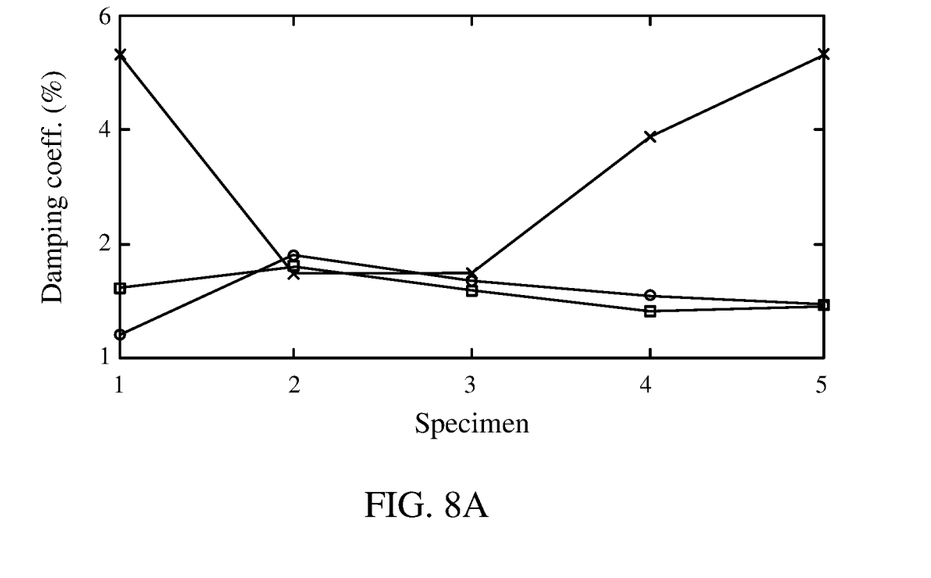
FIG. 8A-8B are diagrams showing change of a modal damping coefficient based on a mode (bending mode and twisting mode) as an orientation of a carbon fiber increases.
Figure 8B:
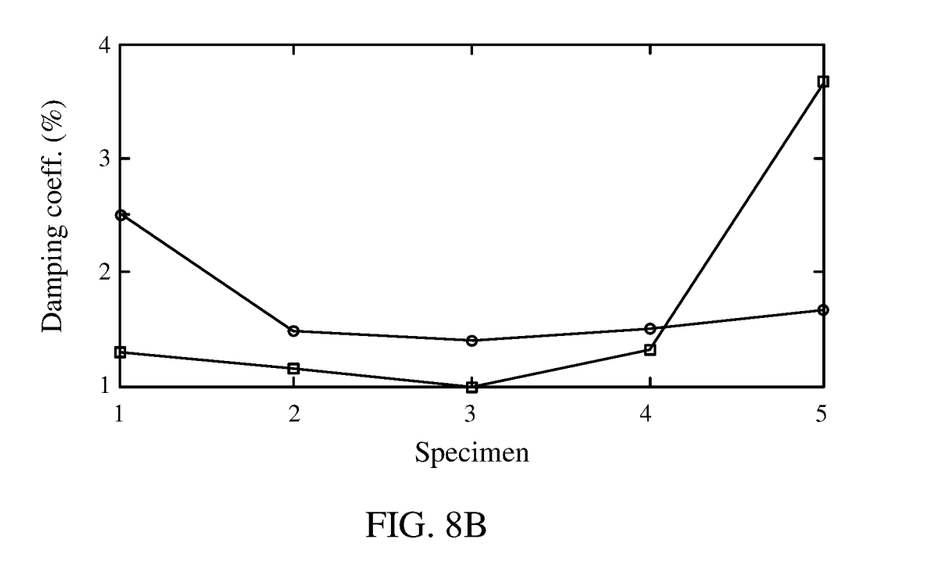

FIG. 7 is a diagram showing change in the resonance frequency based on the mode (bending mode and twisting mode) as the orientation of the carbon fiber increases. FIG. 8 is a view showing change in the modal damping coefficient based on the mode (bending mode and twisting mode) as the orientation of the carbon fiber increases.

Referring to FIG. 7A, it may be identified that in the first bending mode (◌) and the second bending mode (⊟), the resonance frequency decreases as the carbon fiber orientation value θ increases, while in the third bending mode (✲), the resonance frequency increases as the carbon fiber orientation value θ increases.

Referring to FIG. 7B, it may be identified that the resonance frequency may vary depending on the type of the twisting mode. It may be identified that in the first twisting mode (○), the resonance frequency increases as the carbon fiber orientation value θ increases or decreases while the resonance frequency is the lowest when the carbon fiber orientation value θ is 45° (Specimen 3). On the contrary, it may be identified that in the second bending mode (□), the resonance frequency continuously decreases as the carbon fiber orientation value θ increases.

Unlike the resonance frequency in FIG. 7, it is difficult to identify a distinct tendency regarding the modal damping coefficient. Referring to (a) in FIG. 8, it may be identified that in the first bending mode (◌) and the second bending mode (⊟), the modal damping coefficient slightly increases until the carbon fiber orientation value θ is 30° (Specimen 2), while as the carbon fiber orientation value θ increases, the modal damping coefficient decreases. It may be identified that in the third bending mode (✲), when the carbon fiber orientation value θ is 30° and 45° (Specimen 2 and Specimen 3), the modal damping coefficient is decreased, while when the carbon fiber orientation value θ is further increased to 60° and 90° (Specimen 4 and Specimen 5), the modal damping coefficient increases again.

Referring to (a) in FIG. 8, it may be identified that the two twisting modes exhibit a similar trend. In this connection, it may be identified that in the first bending mode (○) and the second bending mode (⊟), when the carbon fiber orientation value θ is 45° (Specimen 3), the modal damping coefficient is the lowest, while the modal damping coefficient increases as the carbon fiber orientation value θ increases or decreases from 45°.

Figure 9:
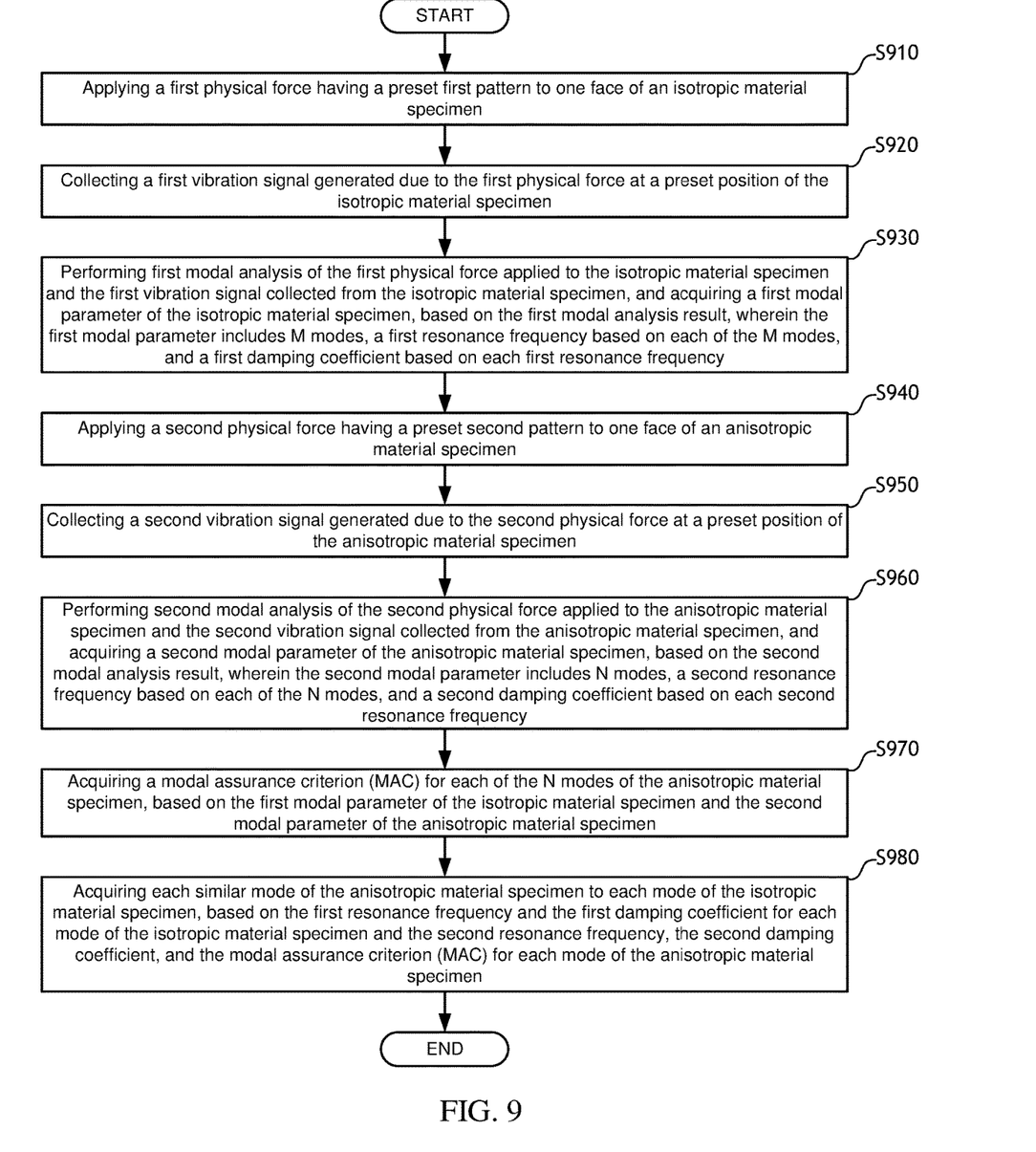
FIG. 9 is a flowchart for illustrating a method for analyzing dynamic mode change of an anisotropic material according to one embodiment of the present disclosure.

FIG. 9 is a flowchart for illustrating a method for analyzing dynamic mode change of an anisotropic material according to one embodiment of the present disclosure.

Referring to FIG. 9, the vibration exciter 120 of the system 100 for analyzing the dynamic mode change applies the physical force of the preset first pattern onto one face of the isotropic material specimen (S910). The sensor 130 of the system 100 collects the vibration signal generated due to the physical force at the preset position of the isotropic material specimen (S920).

The mode change analyzer 140 performs modal analysis of the physical force applied to the isotropic material specimen and the signal measured from the isotropic material specimen, and acquires the first modal parameters of the isotropic material specimen (including M mode, mode-based first resonance frequency, and first resonance frequency-based first damping coefficient) (S930).

The vibration exciter 120 of the system 100 for analyzing the dynamic mode change applies the physical force of the preset second pattern onto one face of the anisotropic material specimen (S940). The sensor 130 collects the vibration signal generated due to the physical force at the preset position of the anisotropic material specimen (S950).

The mode change analyzer 140 performs modal analysis of the physical force applied to the anisotropic material specimen and the signal measured in the anisotropic material specimen, and acquires the second modal parameters of the anisotropic material specimen (including N modes, mode-based second resonance frequency, and second resonance frequency-based second damping coefficient) (S960).

In one embodiment, the system 100 for analyzing the dynamic mode change applies a physical force to the anisotropic material specimen again under the same boundary state condition as in the isotropic material specimen, and thus obtains the second modal parameters of the anisotropic material specimen (including N modes, mode-based second resonance frequency, and second resonance frequency-based second damping coefficient. In one embodiment, the system 100 for analyzing the dynamic mode change may acquire the second modal parameters of each of a plurality of carbon composite materials having different carbon fiber orientations.

The mode change analyzer 140 acquires the modal assurance criterion (MAC) for each of modes of the anisotropic material specimen using the first modal parameters and the second modal parameters (S970). In one embodiment, the mode change analyzer 140 may obtain a modal assurance criterion for each of a plurality of carbon composite materials having different carbon fiber orientations.

The mode change analyzer 140 obtains each similar mode of the anisotropic material specimen to each mode of the isotropic material specimen, based on each mode-based first resonance frequency and each mode-based first damping coefficient of the isotropic material specimen, and each mode-based second resonance frequency, and each mode-based second damping coefficient and each mode-based modal assurance criterion of the anisotropic material specimen (S980). In one embodiment, the mode change analyzer 140 may acquire a similar mode of each of a plurality of carbon composite materials having different carbon fiber orientations.

The acquiring of the modal parameters of the isotropic material specimen and the anisotropic material specimen, the acquiring of the modal assurance criterion, and the acquiring of each similar mode of each anisotropic material specimen are the same as described above with reference to FIG. 1 to FIG. 8.

The method and the system for analyzing the dynamic mode change of the anisotropic material described above with reference to FIG. 1 to FIG. 9 may be implemented using the computer readable media including instructions executable by a computer such as applications or modules executed by the computer.

The computer readable media may be any available media that the computer may access and may include both volatile and non-volatile media, removable and non-removable media. Further, the computer-readable medium may include both a computer storage medium and a communication medium. The computer storage media includes both volatile and nonvolatile, removable and non-removable media implemented using any scheme for storage of information such as computer readable instructions, data structures, modules or other data. The communication media typically includes computer readable instructions, data structures, program modules, or other data in a modulated data signal such as a carrier wave, or other transport mechanism, and includes any information delivery media.

The module may mean hardware capable of performing each function and operation according to each name described in the present disclosure. Further, the module may mean a computer program code capable of performing a specific function and operation. Further, the module may refer to an electronic recording medium on which a computer program code capable of performing a specific function and operation is loaded, for example, a processor.

While the present disclosure has been described with reference to preferred embodiments, those skilled in the art will appreciate that the present disclosure may be variously modified and changed without departing from the spirit and scope of the present disclosure set forth in the following claims.

What is claimed is:

1. A method for analyzing dynamic mode change of an anisotropic material, the method comprising:
applying a first physical force having a preset first pattern to one face of an isotropic material specimen;
collecting a first vibration signal generated due to the first physical force at a preset position of the isotropic material specimen;
performing first modal analysis of the first physical force applied to the isotropic material specimen and the first vibration signal collected from the isotropic material specimen, and acquiring a first modal parameter of the isotropic material specimen, based on a first modal analysis result, wherein the first modal parameter includes M modes, a first resonance frequency based on each of the M modes, and a first damping coefficient based on each first resonance frequency;
applying a second physical force having a preset second pattern to one face of an anisotropic material specimen;
collecting a second vibration signal generated due to the second physical force at a preset position of the anisotropic material specimen;
performing second modal analysis of the second physical force applied to the anisotropic material specimen and the second vibration signal collected from the anisotropic material specimen, and acquiring a second modal parameter of the anisotropic material specimen, based on a second modal analysis result, wherein the second modal parameter includes N modes, a second resonance frequency based on each of the N modes, and a second damping coefficient based on each second resonance frequency;
acquiring a modal assurance criterion (MAC) for each of the N modes of the anisotropic material specimen, based on the first modal parameter of the isotropic material specimen and the second modal parameter of the anisotropic material specimen; and
classifying each mode of the anisotropic material specimen according to the modes of the isotropic material specimen, based on the first resonance frequency and the first damping coefficient for each mode of the isotropic material specimen and the second resonance frequency, the second damping coefficient, and the modal assurance criterion (MAC) for each mode of the anisotropic material specimen.

2. The method of claim 1, wherein the anisotropic material specimen includes a carbon composite material having carbon fibers oriented to have unidirectionality at a specific angle θ.

3. The method of claim 2, wherein the specific angle θ includes one of 0 degree, 30 degrees, 45 degrees, 60 degrees and 90 degrees.

4. The method of claim 3, wherein the acquiring of the second modal parameter of the anisotropic material specimen includes acquiring the second modal parameter of each of a plurality of carbon composite materials having different carbon fiber orientations.

5. The method of claim 4, wherein the acquiring of the modal assurance criterion for each of the N modes of the anisotropic material specimen includes acquiring the modal assurance criterion for each of a plurality of carbon composite materials having different carbon fiber orientations, wherein the acquiring of each mode of the anisotropic material specimen includes acquiring each mode of each of a plurality of carbon composite materials having different carbon fiber orientations.

6. The method of claim 1, wherein the acquiring of the modal assurance criterion includes performing cross-calculation between each of the M modes of the isotropic material specimen and the N modes of the anisotropic material specimen to calculate the modal assurance criterion.

7. The method of claim 6, wherein the acquiring of the modal assurance criterion includes calculating the modal assurance criterion using a following Equation 1:

$$MAC(i, j) = \frac{|(\psi_i)^T (\psi_j)^*|^2}{((\psi_i)^T (\psi_j)^*)((\psi_j)^T (\psi_i)^*)} \quad \text{[Equation 1]}$$

where $(\psi_i)^T$ denotes a transpose matrix of an i-th mode shape $\psi_i$, and $(\psi_i)^*$ denotes a conjugate matrix of the i-th mode shape $\psi_i$. Further, $(\psi_j)^T$ and $(\psi_j)^*$ respectively denote a transpose matrix and a conjugate matrix of a j-th mode shape $\psi_j$.

8. The method of claim 1, wherein the acquiring of each mode of the anisotropic material specimen includes:
acquiring a mode shape of the isotropic material specimen comparable to a mode shape of each mode of the anisotropic material specimen, using mode shape information of each mode of the isotropic material specimen as reference data.

9. A system for analyzing dynamic mode change of an anisotropic material, the system comprising:
a vibration exciter configured to:
set a first vibration-excitation pattern under control and apply a first physical force having the first vibration-excitation pattern to one face of an isotropic material specimen; and
set a second vibration-excitation pattern under control and apply a second physical force having the second vibration-excitation pattern to one face of an anisotropic material specimen;
and a sensor configured to:
collect a first vibration signal generated from the isotropic material specimen due to the first physical force at a preset location of the isotropic material; and
collect a second vibration signal generated from the anisotropic material specimen due to the second physical force at a preset location of the anisotropic material; and
a modal analyzer configured to:
perform first modal analysis of the first physical force applied to the isotropic material specimen and the first vibration signal collected from the isotropic material specimen; acquire a first modal parameter of the isotropic material specimen, based on a first modal analysis result, wherein the first modal parameter includes M modes, a first resonance frequency based on each of the M modes, and a first damping coefficient based on each first resonance frequency;
perform second modal analysis of the second physical force applied to the anisotropic material specimen and the second vibration signal collected from the anisotropic material specimen; and acquire a second modal parameter of the anisotropic material specimen, based on a second modal analysis result, wherein the second modal parameter includes N modes, a second resonance frequency based on each of the N modes, and a second damping coefficient based on each second resonance frequency; and
a mode analyzer configured to:
acquire a modal assurance criterion (MAC) for each of the N modes of the anisotropic material specimen, based on the first modal parameter of the isotropic material specimen and the second modal parameter of the anisotropic material specimen; and
classify each mode of the anisotropic material specimen according to the modes of the isotropic material specimen, based on the first resonance frequency and the first damping coefficient for each mode of the isotropic material specimen and the second resonance frequency, the second damping coefficient, and the modal assurance criterion (MAC) for each mode of the anisotropic material specimen.

10. The system of claim 9, wherein the anisotropic material specimen includes a carbon composite material having carbon fibers oriented to have unidirectionality at a specific angle θ.

11. The system of claim 10, wherein the specific angle θ includes one of 0 degree, 30 degrees, 45 degrees, 60 degrees and 90 degrees.

12. The system of claim 9, wherein the mode analyzer is further configured to perform cross-calculation between each of the M modes of the isotropic material specimen and the N modes of the anisotropic material specimen to calculate the modal assurance criterion.

13. The system of claim 12, wherein the mode analyzer is further configured to calculate the modal assurance criterion using a following Equation 1:

$$MAC(i, j) = \frac{|(\psi_i)^T (\psi_j)^*|^2}{((\psi_i)^T (\psi_j)^*)((\psi_j)^T (\psi_i)^*)} \quad \text{[Equation 1]}$$

where $(\psi_i)^T$ denotes a transpose matrix of an i-th mode shape $\psi_i$, and $(\psi_i)^*$ denotes a conjugate matrix of the i-th mode shape $\psi_i$ and wherein, $(\psi_j)^T$ and $(\psi_j)^*$ respectively denote a transpose matrix and a conjugate matrix of a j-th mode shape $\psi_j$.

\* \* \* \* \*